(12) United States Patent
Ishida et al.

(10) Patent No.: US 7,481,463 B2
(45) Date of Patent: Jan. 27, 2009

(54) CONNECTOR DEVICE AND CHECKER

(75) Inventors: Yoshimitsu Ishida, Kasugai (JP); Akira Takayanagi, Nishikasugai-gun (JP)

(73) Assignee: Tokai Rubber Industries, Inc. (JP)

( * ) Notice: Subject to any disclaimer, the term of this patent is extended or adjusted under 35 U.S.C. 154(b) by 409 days.

(21) Appl. No.: 11/373,930

(22) Filed: Mar. 13, 2006

(65) Prior Publication Data
US 2006/0208743 A1 Sep. 21, 2006

(30) Foreign Application Priority Data
Mar. 16, 2005 (JP) ............................ 2005-075826
Feb. 16, 2006 (JP) ............................ 2006-040023

(51) Int. Cl.
*F16L 37/00* (2006.01)

(52) U.S. Cl. ........................ 285/305; 285/190; 285/202; 285/376; 285/403

(58) Field of Classification Search .................. 285/93, 285/139.3, 190, 202, 305, 376, 401–403, 285/921
See application file for complete search history.

(56) References Cited

U.S. PATENT DOCUMENTS

| | | | | |
|---|---|---|---|---|
| 1,221,935 A | * | 4/1917 | White ........................ | 285/86 |
| 2,244,427 A | * | 6/1941 | Miller ........................ | 72/339 |
| 5,607,190 A | * | 3/1997 | Exandier et al. ............ | 285/93 |
| 5,882,047 A | * | 3/1999 | Ostrander et al. ........... | 285/319 |
| 6,811,098 B2 | * | 11/2004 | Drechsel ..................... | 239/498 |
| 2005/0082828 A1 | * | 4/2005 | Wicks et al. ................ | 285/319 |

FOREIGN PATENT DOCUMENTS

| | | |
|---|---|---|
| JP | 10-103179 | 4/1998 |
| JP | 2943722 | 8/1999 |

* cited by examiner

*Primary Examiner*—Aaron M Dunwoody
*Assistant Examiner*—Fannie Kee
(74) *Attorney, Agent, or Firm*—Andrus, Sceales, Starke & Sawall, LLP

(57) ABSTRACT

A connecting portion of a quick connector is provided with a pair of stop arms. Each of the stop arms has an arm body that integrally includes an overhanging stop portion and an engaging pawl on a leading end portion thereof. The connecting portion is inserted in a connecting hole formed in a fluid line component until the engaging pawl engages with an outwardly directed engaging projection of a mounting portion that is provided on an opening portion of the connecting hole. A checker has a main body that is provided integrally with verifying portions. Each of the verifying portions is formed with a receiving recessed portion for accommodating the overhanging stop portion therein when the checker is disposed on an outer circumference of the mounting portion.

11 Claims, 8 Drawing Sheets

CONNECTOR DEVICE AND CHECKER

BACKGROUND OF THE INVENTION

1. Field of the Invention

The present invention relates to a connector construction that is adapted for connection of a fluid piping of a motor vehicle or the like, for example, a connector device for connecting a tube to a fuel pump of the motor vehicle, and a checker that is used for the connector device.

2. Description of the Related Art

A gasoline fuel piping of a motor vehicle is constructed by connecting a tube with a fuel pump that is provided on a gasoline fuel tank. The tube is connected with the fuel pump in such manner or mode that a connecting hole is formed in a cap of the fuel pump, a tube is fitted on and connected to a quick connector, and the quick connector with the tube thereon is inserted in and connected to the connecting hole. The quick connector to be used for connecting the tube and the fuel pump integrally has a cylindrical connecting portion and the tube fit-on portion that is formed bent on one end or a distal end of the connecting portion. And, the tube, for example, made of resin is tightly fitted on an outer circumference of the tube fit-on portion.

With respect to a connector mounting structure for mounting a quick connector to a fuel pump, etc., for example, known is one disclosed in Patent Document 1 below. In the connector mounting structure of the Patent Document 1, a cap of a fuel pump is provided with a retainer holding portion (clip holding portion) on an outer surface thereof, on a periphery of an opening of a connecting hole (an opening portion) that is formed in the cap. First, a connecting portion of a quick connector is inserted rotatably in the connecting hole. A retainer of horse-shoe shape is inserted and installed to the retainer holding portion so as to engage with an outwardly directed flange-shaped stop portion (flange-shaped stopper portion) formed on the connecting portion, and thereby mounting of the quick connector is completed. This configuration allows to minimize a length or height of the quick connector raising from the cap. Further, when orientation of a tube extending from a fuel pump varies due to different vehicle types, the quick connector can be rotated freely in any direction corresponding to the orientation of the tube. This ensures general versatility to meet piping arrangement of various vehicle types.

Patent Document 1 JP-B, 2943722

By the way, in the mounting structure or a connector device according to Patent Document 1, the quick connector cannot be stopped from return movement only by inserting the connecting portion of the quick connector in the connecting hole. Thus, such measure are employed that another component, i.e., the retainer is inserted to the retainer holding portion to secure connection of the quick connector in locked state. However, if the retainer is forgotten to be installed, a piping is to be used while the quick connector is in condition to easily disconnect from the connecting hole. This may become a cause for leakage of a gasoline fuel. Or when the retainer is installed to the retainer holding portion while the connecting portion of the quick connector is incompletely inserted in the connecting hole, the retainer may enter in an axially inner side of the outwardly directed flange-shaped stop portion, and the retainer cannot serve as a stop with respect to the quick connector. Here, likewise exists a fear to cause leakage of a gasoline fuel.

Under the circumstances described above, it is an object of the present invention to provide a connector device wherein a connector can be easily connected to a fluid line component and prevented from being incompletely connected thereto, and a checker to be used for the connector device.

SUMMARY OF THE INVENTION

In order to achieve a foregoing object, there is provided a novel connector device for being connected to a fluid line component that is formed with a connecting hole. The fluid line component means a component such as a fuel pump or a fuel tank that is provided in a fluid piping or fluid line. The fluid line component is provided with an annular mounting portion raised outwardly on an opening portion of the connecting hole. The mounting portion includes an outwardly directed engaging projection of annular shape. The connector device comprises a connector that has a connecting portion to be inserted in the connecting hole for establishing connection to the fluid line component, and a checker. The connecting portion is provided with a pair of or at least a pair of stop arms at diametrically symmetrical positions thereof, and each of the stop arms includes an engaging pawl for snap-engaging with the outwardly directed engaging projection of the mounting portion in locking relation or in a locking direction (or in a direction of withdrawal of the connecting portion). The checker has a main body to be disposed on an outer circumference of the mounting portion from a lateral side thereof, and verifying portions or a pair of verifying portions on widthwise opposite ends of the main body so as to be located outside the stop arms, respectively. Each of the stop arms is provided with a protruding stop portion such as an overhanging stop portion protruding or overhanging outwardly, each of the verifying portions is formed so as to locate an inner surface of the verifying portion inside an outer surface of the protruding stop portion, and the inner surface of the verifying portion is formed with a verifying recessed portion for accommodating the protruding stop portion when the engaging pawl correctly engages the outwardly directed engaging projection. The main body of the checker is formed, for example, into a thin-walled U-shaped body or a thin-walled horseshoe shaped body. As the connecting portion of the connector is inserted in the connecting hole, the engaging pawl of the stop arm abuts the outwardly directed engaging projection of the mounting portion, for example, from one axial side or an outer axial side. When the connecting portion is further inserted or plugged in the connecting hole, the engaging pawl passes over the outwardly directed engaging projection and snap-engages with the outwardly directed engaging projection in a locking direction, namely in a direction of withdrawal of the connecting portion or in locking relation. In this state, the checker is moved so as to follow an outer circumference of the mounting portion from a lateral side, the verifying portion is located outside the stop arm while accommodating the protruding stop portion in the verifying recessed portion, and the checker is arranged at a predetermined position. Here, for example, as the checker is moved in an installed direction, the protruding stop portion enters in the verifying recessed portion. So, complete connection of the connector can be verified. However, when the connecting portion of the connector is not inserted in the connecting hole sufficiently, and the engaging pawl does not pass over the outwardly directed engaging projection, namely, in case of incomplete fit-in relation or incomplete connection, the protruding stop portion is displaced in one axial direction or in a direction away from the connecting hole, and is not located so as to be accommodated in the verifying recessed portion. In this state, when the checker is installed so as to follow the outer circumference of the mounting portion from the lateral side, the verifying portions abut the protruding stop portions, since the verifying portions are formed such that their inner surfaces are to be located inside outer surfaces of the protruding stop portions or, for example, a distance between their inner surfaces is smaller than a distance between the outer surfaces of the protruding stop portions. So, it is not possible to dispose the checker at the predetermined position. Thereby incomplete fitting relation can be verified, and connecting work of the connector will be done again by inserting the connecting portion sufficiently in the connecting hole.

The protruding stop portion may be provided on an axially inner end portion of the stop arm. And, the verifying recessed portion may be defined in an axially inner end portion (axially inner side) of the verifying portion so as to correspond to the protruding stop portion. Preferably, the verifying portion is configured so as to accommodate the protruding stop portion in the verifying recessed portion while contacting with the outer surface of the stop arm (the phrase "contacting" here includes "a condition just before contacting with the outer surface of the stop arm). In this configuration, since the stop arms are restrained from spreading apart outwardly by the verifying portions, engagement of the engaging pawl with the outwardly directed engaging projection is more strengthened. In addition, it is effective to configure the protruding stop portion or the overhanging stop portion so as to be caught between the verifying recessed portion and the main body on both sides of the protruding stop portion or the overhanging stop portion, when the engaging pawl correctly engages the outwardly directed engaging projection and the checker is installed or disposed. In such construction, since the protruding stop portion is restrained from deformation, specifically when the engaging pawl is provided close to the protruding stop portion, stable engagement between the engaging pawl and the outwardly directed engaging portion can be enhanced. And, it is advantageous to configure the main body so as to enter axially inside the engaging pawl to support the engaging pawl directly or by way of other part of the stop arm.

According to the present invention, there is provided a novel checker for verifying connection between a fluid line component and a connector. The fluid line component is formed with a connecting hole, and provided with an annular mounting portion raised outwardly on an opening portion of the connecting hole. The mounting portion includes an outwardly directed engaging projection of annular shape. The connector has a connecting portion to be inserted in the connecting hole for establishing connection to the fluid line component. The connecting portion is provided with a pair of or at least a pair of stop arms at diametrically symmetrical positions thereof. Each of the stop arms includes an engaging pawl for snap-engaging with the outwardly directed engaging projection of the mounting portion in a locking direction, namely in a direction for stopping withdrawal of the connecting portion or the connector or in locking relation. Each of the stop arms is provided with a protruding stop portion such as an overhanging stop portion protruding or overhanging outwardly. The checker comprises a main body to be disposed on an outer circumference of the mounting portion from a lateral side thereof, verifying portions or a pair of verifying portions that are provided on widthwise opposite ends of the main body so as to be located outside the stop arms, respectively. Each of the verifying portions is configured so as to locate an inner surface thereof inside an outer surface of the protruding stop portion, and the inner surface of the verifying portion is formed with a verifying recessed portion for accommodating the protruding stop portion when the engaging pawl correctly engages with the outwardly directed engaging projection. The verifying portions are formed, for example, such that a distance between inner surfaces thereof is smaller than a distance between the outer surfaces of the protruding stop portions. The checker may construct an anti-rotation mechanism for holding the checker non-rotatably between the checker and the mounting portion.

In the connector device and the checker (the connector mounting structure) according to the present invention, an anti-rotation mechanism may be constructed between the mounting portion and the checker, for holding the checker non-rotatably. In many cases, the checker is installed to the connector relatively non-rotatably, for example, by engagement of the stop arm with the verifying portion. In such case, when the anti-rotation mechanism is constructed between the mounting portion and the checker, the connector is stopped from rotating with respect to the mounting portion (the fluid line component). So, it can be prevented that the connector rotates with respect to the fluid line component due to vibration exerted, etc., resulting in failure such as early abrasion of a sealing member that provides a seal between the connector and the fluid line component. The anti-rotation mechanism is preferably constructed so as to hold the checker selectively at one of a plurality of angular positions (mounting angular positions in the circumferential direction or mounting rotation angular positions). The connector is provided with a tube fit-on portion (a portion to be fitted with any mating member), for example, in a bent manner on a distal end of the connecting portion (an axially outer end of the connecting portion). So, such configuration, which allows to connect the connector to the fluid line component while varying orientation of a checker, thus the connector (the portion to be fitted with the mating member), for example, allows to connect the connector to the fluid line component according to an orientation of a tube to be disposed. It is effective to set the number of selective angular positions for holding or positioning the checker in a range of four to twenty, for example, in equally spaced relation. At less than four angular positions for holding the checker, it is not possible to arrange the connector so as to sufficiently meet a piping arrangement requirement. On the other hand, at more that twenty angular positions for holding the checker, the anti-rotation structure becomes too complicate and it is feared that the checker is positioned at an angular position different from the predetermined one. For example, the anti-rotation mechanism may comprise an engaging notched portion or engaging dent portion that is formed in either one of the outer circumference of the mounting portion or the main body of the checker, and an engaging protruding portion that is provided on the other of the outer circumference of the mounting portion or the main body for fitting in and engaging with the engaging notched portion, more specifically, engaging with the engaging notched portion in a circumferential direction. Here, the engaging notched portion may be formed on the outer circumference of the mounting portion and the engaging protruding portion may be provided on the main body of the checker. And, the anti-rotation mechanism may be constructed such that a plurality of engaging notched portions are formed in the outer circumference of the mounting portion in circumferentially spaced relation and an engaging protruding portion selectively fits in and engages with one of the engaging notched portions in the circumferential direction. In this manner, it becomes possible to hold the checker selectively at one of the plurality of different angular positions. The engaging notched portions are formed at four to twenty positions, for example, in circumferentially equally spaced relation.

As described above, with the connector device of the present invention, the connector can be connected to the connecting hole with simple operation while being stopped from withdrawal, and just in case of incomplete connection, it can be surely detected by means of a checker.

Now, the preferred embodiments of the present invention will be described with reference to the drawings.

DETAILED DESCRIPTION OF THE PREFERRED EMBODIMENTS

Figure 1:
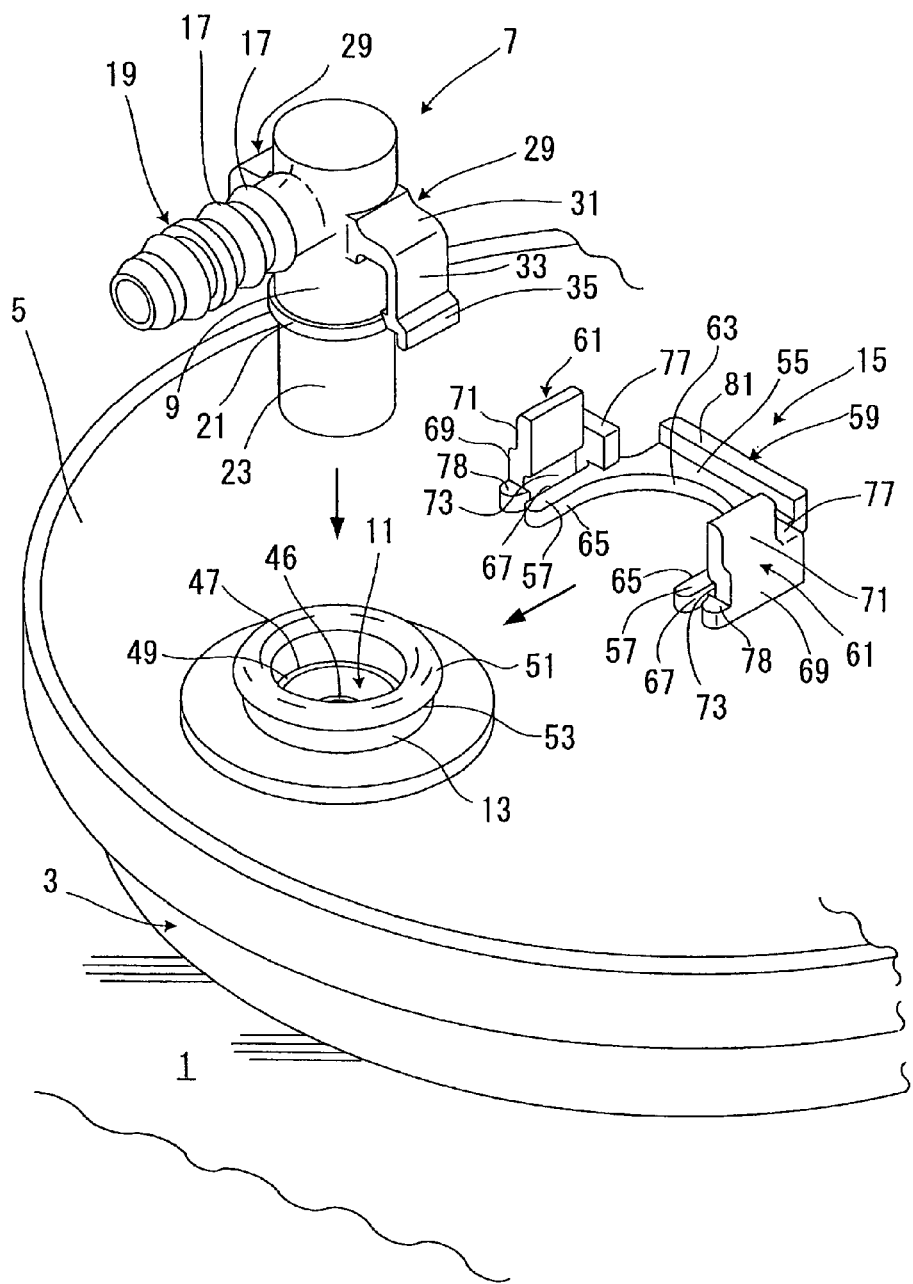
FIG. 1 is an exploded perspective view of a connector device according to the present invention that is mounted to a fuel pump of a motor vehicle.

As well shown in FIG. 1, a fuel tank 1 for a motor vehicle is provided with a fuel pump 3 that has a cap 5, and this cap 5 is formed with a connecting hole 11 in which a tubular connecting portion 9 of a quick connector 7 is inserted. An annular mounting portion 13 is provided on a rim or rim portion of an opening of the connecting hole 11. The quick connector 7 is inserted into the connecting hole 11 via the mounting portion 13, and engages with the mounting portion 13 in locking relation. The quick connector 7 is inserted in the connecting hole 11 in this manner, then a checker (clip) 15 is fitted to an outer circumferential surface of the mounting portion 13 to verify that the quick connector 7 is mounted and connected to the connecting hole 11 or the mounting portion 13 correctly.

Figure 2:
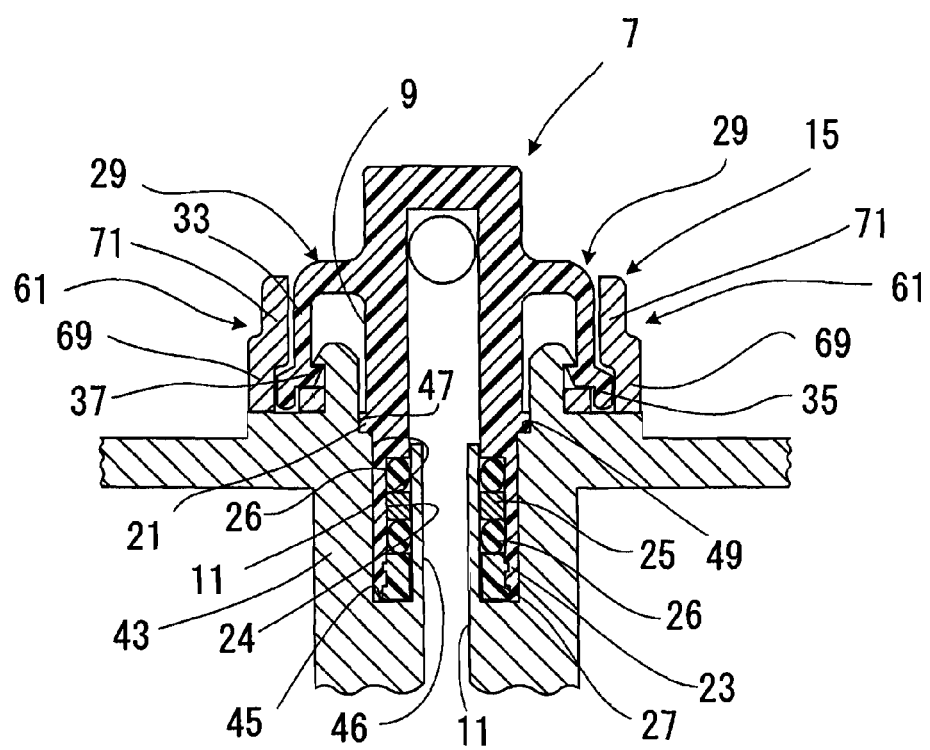
FIG. 2 is a sectional view of the connector device that is mounted to the fuel pump.

The quick connector 7 in such a connector mounting structure has a tube fit-on portion 19. The tube fit-on portion 19 is formed to be bent out at 90°, namely bent out just laterally on one axial end or a distal end of the tubular connecting portion 9 (on an axially outer end of the tubular connecting portion 9). The tube fit-on portion 19 is provided with a plurality of annular stop ribs 17 on an outer circumference or outer circumferential surface thereof. The quick connector 7 is integrally made of resin material such as fiber-reinforced polyamide (PA) or fiber-reinforced polyacetal (POM). The tubular connecting portion 9 of the quick connector 7 is provided integrally with an annular positioning portion 21 shaped outwardly directed flange on an axial center or generally axial center thereof. One axial end of the connecting portion 9 with respect to the annular positioning portion 21 is designed slightly larger in outer diameter than the other axial end (axially inner end) thereof with respect to the annular positioning portion 21. As well shown in FIG. 2, on the other axial end of the connecting portion 9 with respect to the annular positioning portion 21, an inserting portion 23 is defined. An inner circumference of the other axial end of the inserting portion 23 (an inner circumference of a major part of the inserting portion 23 except for a minor portion thereof on one axial end) is formed with large diameter to define a receptacle portion 24. In the receptacle portion 24, two O-rings 26, 26 are fitted in with a collar 25 intervening therebetween. In the other axial end portion of the receptacle portion 24, a resin bush 27 is fitted for stopping the O-rings 26, 26 from coming off. Here, since the O-rings 26, 26 are arranged inside the connecting portion 9 or the inserting portion 23, it is effectively prevented that the O-rings 26 are damaged by contact with other parts during insertion or connection of the quick connector 7. An outer circumferential surface of the inserting portion 23 of the connecting portion 9 is formed so as to have an equal outer diameter along an entire axial length thereof. And, the quick connector 7 is provided integrally with a pair of stop arms 29, 29 protruding radially outwardly (outwardly) on one axial end of the connecting portion 9 with respect to the annular positioning portion 21, at an axial position generally identical to a position where the tube fit-on portion 19 is formed. The pair of the stop arms 29, 29 are disposed at diametrically symmetrical positions of the connecting portion 9 (the stop arms 29, 29 are disposed perpendicular to the tube fit-on portion 19, respectively), and each is formed like a plate with a width generally equal to an outer diameter of the tube fit-on portion 19 (an outer diameter of a portion of the tube fit-on portion 19 close to its base).

Figure 4:
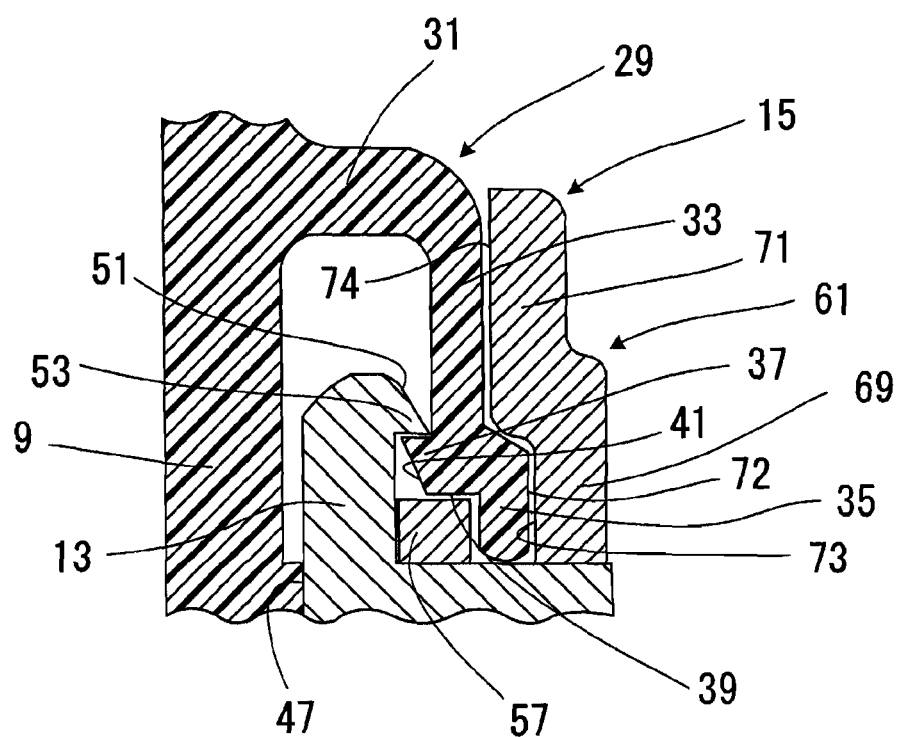
FIG. 4 is an enlarged view of a periphery of a leading end portion of an arm body.

Each of the stop arms 29, 29 integrally has a support portion 31 protruding radially outwardly from an outer circumferential surface of the connecting portion 9, and an arm body 33 that is bent out from a radially outer end portion (outer end portion) of the support portion 31 and extends in a direction toward the other axial end, namely, in the other axial direction. The arm body 33 integrally includes an overhanging stop portion (protruding stop portion) 35 and an engaging pawl 37 on the other axial end portion (leading end portion or axially inner end portion) thereof. As well shown in FIG. 4, the overhanging stop portion 35 is defined by bending a leading end portion of the arm body 33 so as to overhang outwardly by a length corresponding to a thickness of the arm body 33, and an inserting recessed portion 39 is defined radially inside (inside) the overhanging stop portion 35. The engaging pawl 37 is formed integrally on a radially inner surface (inner surface) of the arm body 33, on an axially outer end with respect to the inserting recessed portion 39 and adjacent the inserting recessed portion 39, so as to protrude slightly radially inwardly. The engaging pawl 37 includes a radially inner end surface 41 that is slanted radially outwardly in the other axial direction. The engaging pawl 37 has a right triangle cross-section.

The cap 5 is provided integrally with a cylindrical portion 43 protruding inwardly so as to extend inside the fuel tank 1. And the connecting hole 11 is defined through from an outer surface of the cap 5 to an axially inner end or axially inner extremity end of the cylindrical portion 43. The connecting hole 11 has an inner diameter generally equal to an outer diameter of the inserting portion 23 on one axial end thereof, while having an inner diameter smaller than that of the inserting portion 23 on the other axial end thereof (the other axial end thereof with respect to the one axial end). The connecting hole 11 has an annular abutting surface 45 at an axially midportion for stopping further insertion of the connecting portion 9 of the quick connector 7. An inner cylindrical portion 46 is formed so as to extend from an inner circumferential portion of the annular abutting surface 45 in one axial direction. A deep annular receiving groove is defined in an outer circumference of the inner cylindrical portion 46. An opening portion of the connecting hole 11 on a side of the cap 5 is formed as a large-diameter receiver portion 47, which has an inner diameter generally equal to an outer diameter of the annular positioning portion 21 of the quick connector 7, and includes an annular abutting bottom surface 49. Meanwhile, the inner cylindrical portion 46 may not be formed in the connecting hole 11, and in this case an O-ring as a sealing member may be fitted on an outer circumference of the inserting portion 23 of the connector 7 for providing a seal with respect to the connecting hole 11.

The mounting portion 13 raised axially outwardly is formed integrally on a circumferential rim portion of an opening of the connecting hole 11 so as to share a common inner circumferential surface with the receiver portion 47 (such that the inner circumferential surfaces of the mounting portion 13 and the receiver portion 47 are located continuously on an identical or single cylindrical inner surface). The mounting portion 13 has an outwardly directed engaging projection 53 of a right triangle cross-section on an outer circumferential surface of an axially outer end portion (leading end portion). The outwardly directed engaging projection 53 includes an annular axially outer end surface 51 that is slanted radially outwardly in an axially inward direction.

The checker 15 integrally has a thin-walled main body 59 of generally U-shape or horseshoe shape, and verifying portions 61. The main body 59 integrally includes a base portion 55 and a pair of clip portions 57, 57 with narrow width that are formed on widthwise opposite ends of the base portion 55. The verifying portions 61 are disposed outside (widthwise outside) the clip portions 57 with a slight clearance with respect to the clip portions 57, respectively. Each of the verifying portions 61 is connected to the clip portion 57 at an end thereof near the base portion 55. Each of the clip portions 57, 57 extends from the base portion 55 in a direction perpendicular to the base portion 55. The main body 59 and the verifying portions 61 include rear surfaces (bottom surfaces or axially inner end surfaces) that are located on a common plane. The main body 59 includes an inner surface (inner circumferential surface or a surface like an inner circumference) corresponding to a shape of an outer circumferential surface of a circular cross-section of the mounting portion 13. An inner surface that is defined by an inner surface of the base portion 55 and inner surfaces of the clip portions 57, 57 near the base portion 55 has a semicircular shape with a diameter equal to or generally equal to a diameter of an outer circumferential surface of the mounting portion 13 and defines a fit-on inner surface 63. Inner surfaces 65, 65 of the clip portions 57, 57 on leading ends (ends opposite to the base portion 55) thereof extend in a tangential direction with respect to opposite ends of the fit-on inner surface 63, while maintain a distance equal to or generally equal to a diameter of the outer circumferential surface of the mounting portion 13 (smaller than an outer diameter of the outwardly directed engaging projection 53), and thereby define holding portions. Outer surfaces (widthwise outer surfaces) 67, 67 of the clip portions 57, 57 extend parallel to the inner surfaces 65, 65 or in the tangential direction with respect to the opposite ends of the fit-on inner surface 63, respectively.

Figure 3:
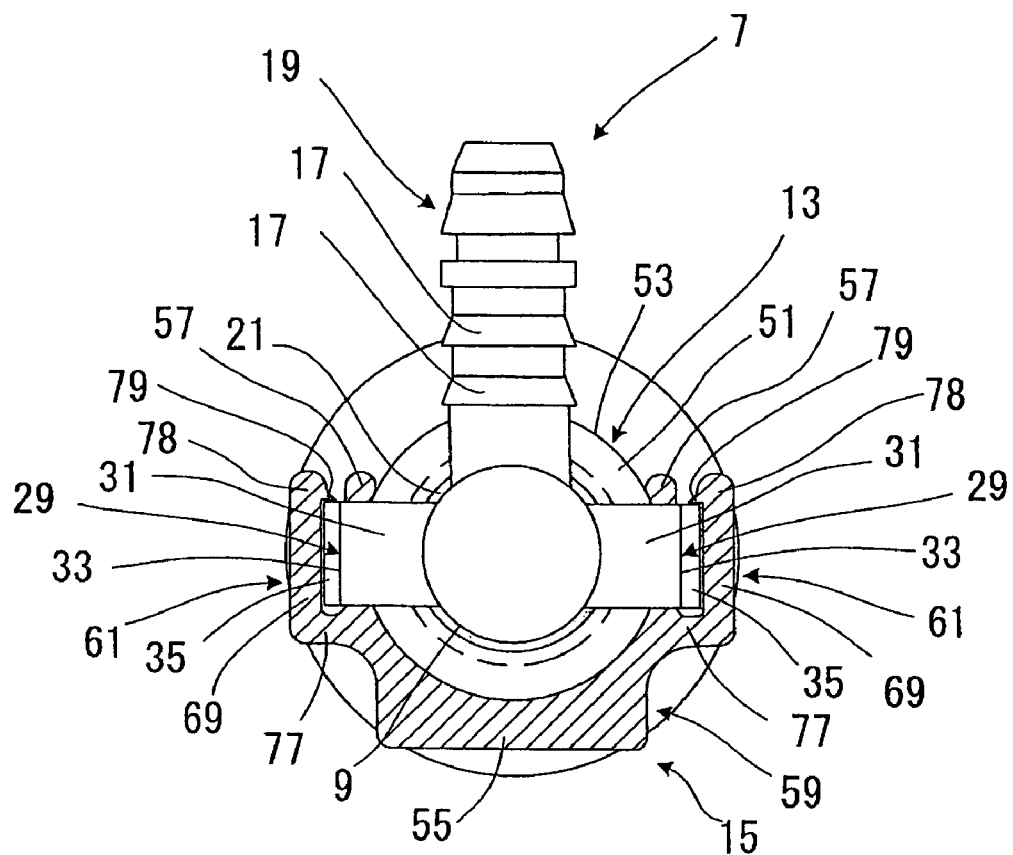
FIG. 3 is a plan view of the connector device that is mounted to the fuel pump.

The verifying portion 61 is formed like a side wall extending axially outwardly, and integrally has a receiving portion 69 on an axially inner end thereof, and an abutting portion 71 on an axially outer end thereof. Since the receiving portion 69 is bent out from the abutting portion 71 so as to project outwardly from the abutting portion 71 by a length equal to or slightly smaller than a wall thickness of the receiving portion 69, a receiving recessed portion 73 is defined inside or widthwise inside the receiving portion 69. Namely, although an inner surface of the verifying portion 61 is to be located inside an outer surface 72 of the overhanging stop portion 35 (refer to an inner surface 74 of the abutting surface 71 in FIGS. 4 and 6), the receiving recessed portion (verifying recessed portion) 73 is defined in an axially inner end portion of the inner surface (axially inner end portion of the verifying portion 61), and therefore the inner surface of the verifying portion 61 is recessed outwardly on an axially inner end portion for accommodating the overhanging stop portion 35. The receiving recessed portion 73 has an axial height about double a thickness of the clip portion 57, and generally equal to an axial height of the overhanging stop portion 35 of the arm body 33. Each of the verifying portions 61 is connected to the main body 59 by a connecting section 77 that is formed on an end portion of the receiving portion 69 near the base portion 55 so as to extend widthwise inwardly, and is integrally connected to an outer side surface and outer surface of the clip portion 57 near its base. As well shown in FIG. 1, a leading end of the verifying portion 61 is located closely behind a leading end of the clip portion 57 toward the base portion 55. However, the receiving portion 69 is provided with a protruding portion 78 on an end portion near a bottom surface of the leading end thereof. As well shown in FIG. 3, a leading end of the protruding portion 78 extends to a position of the leading end of the clip portion 57, and is provided integrally with a retaining jut 79 on an inner surface or widthwise inner surface thereof. The retaining jut 79 includes a leading end surface that is slanted widthwise inwardly in a direction toward the base portion 55, and is formed in a right triangle cross-section. The protruding portion 78 and the retaining jut 79 include a rear surface or bottom surface coplanar with a rear surface or bottom surface of the receiving portion 69, and has the same thickness as the clip portion 57. Meanwhile, reference numeral 81 indicates an operating rib formed on the base portion 55, so as to be raised axially outwardly.

The quick connector 7 is mounted to the cap 5 of the fuel pump 3 in a following manner. First, the connecting portion 9 of the quick connector 7 is plugged in the mounting portion 13 and inserted into the connecting hole 11. The quick connector 7 is pushed in the connecting hole 11 in an inserting direction until the annular positioning portion 21 of the connecting portion 9 is received in the receiver portion 47 of the connecting hole 11 to abut the annular abutting bottom surface 49 or the inserting portion 23 of the connecting portion 9 seats in the annular receiving groove with its axially inner end abutting the annular abutting surface 45. Then, just before completion of insertion, the radially inner end surfaces 41, 41 of the engaging pawls 37, 37 of the stop arms 29, 29 abut the axially outer end surface 51 of the outwardly directed engaging projection 53 of the mounting portion 13. And, as the connecting portion 9 is moved in the inserting direction, the engaging pawls 37, 37 pass over the outwardly directed engaging projection 53 while being displaced radially outwardly and finally snap engage with the outwardly directed engaging projection 53 in a locking direction. Thereby insertion of the quick connector 7 is completed. In this state, leading end (axially inner end) of the overhanging stop portion 35 is located, for example, on a verge of contact with the surface of the cap.

Figure 5:
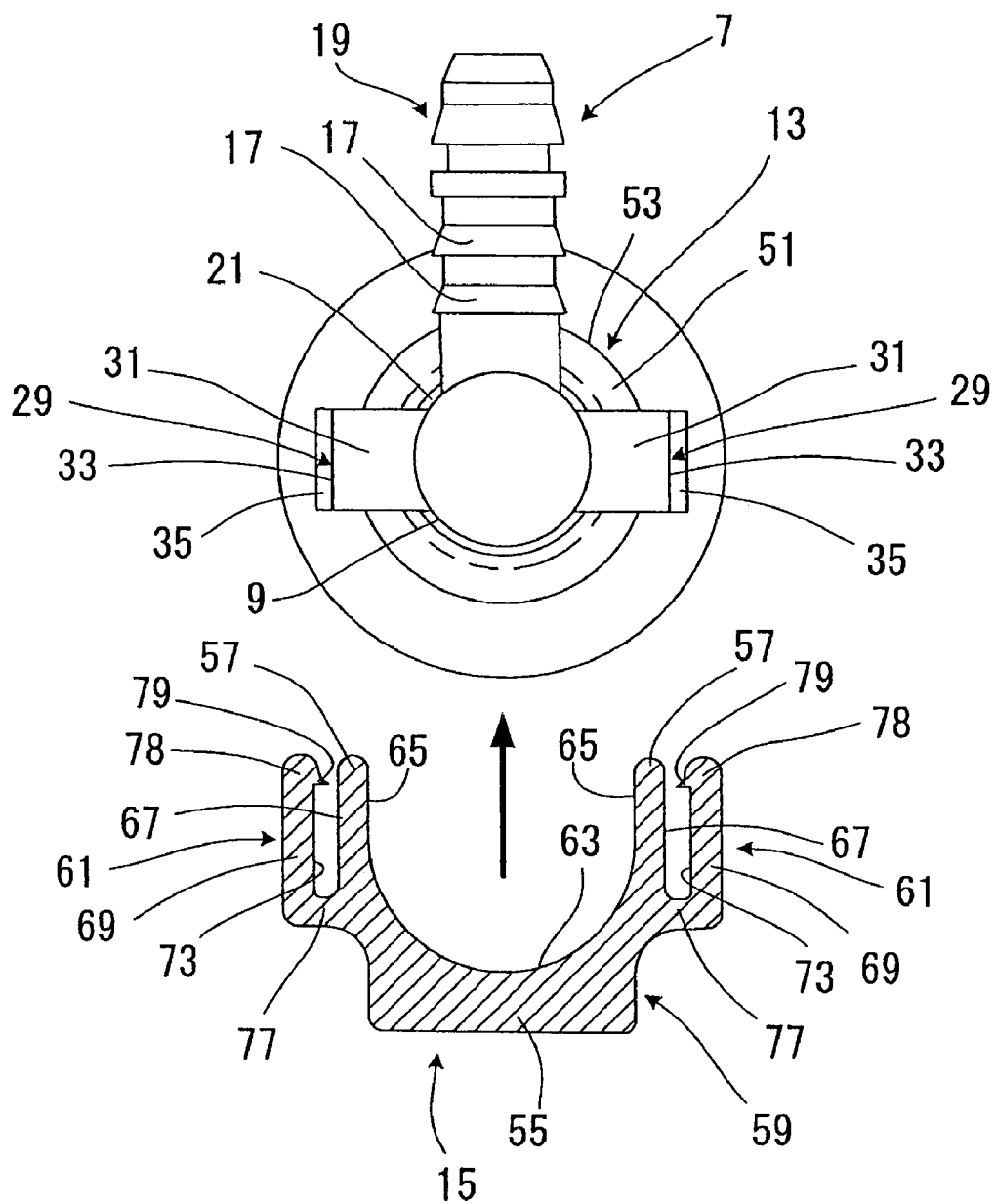
FIG. 5 is a view showing a process of mounting the connector device according to the present invention.

Then, as shown in FIG. 5, the checker 15 is fitted on the outer circumference of the mounting portion 13 from a lateral side thereof. The checker 15 is fitted to the mounting portion 13 by sliding its rear surface or bottom surface over the surface of the cap 5 on a periphery of the mounting portion 13 so as to orient the clip portion 57 in an extending direction of the tube fit-on portion 19 or orient the clip portion 57 in a direction perpendicular to the support portion 31 of the stop arm 29. Since the quick connector 7 is in condition to rotate freely with respect to the connecting hole 11, it is preferred to hold the quick connector 7 by fingers against rotational movement when the checker 15 is fitted to the mounting portion 13.

The checker 15 is not fitted completely until the fit-on inner surface 63 receives the outer circumferential surface of the mounting portion 13 in contact relation.

While the checker 15 is fitted or installed in this manner, first, leading end surfaces of the retaining juts 79 of the receiving portions 69 abut the overhanging stop portions 35 of the stop arms 29, respectively. As the checker 15 is further moved toward the mounting portion 13, leading ends of the receiving portions 69 spread apart radially outwardly (widthwise outwardly) and the overhanging stop portions 35 enter between the receiving recessed portions 73 and the clip portions 57, respectively. A length of the receiving recessed portion 73, namely a distance between the retaining jut 79 and the connecting section 77 is designed equal to or generally equal to a width of the overhanging stop portion 35. So, when installation of the checker 15 is completed, the overhanging stop portion 35 is received between the receiving recessed portion 73 and the clip portion 57 while being locked by the retaining jut 79 and the connecting section 77. Namely, the overhanging stop portion 35 is sandwiched by the receiving recessed portion 73 and the clip portion 57 at both ends thereof. Here, the receiving recessed portion 73 contacts with the outer surface 72 of the overhanging stop portion 35 (including a condition on a verge of contact therewith), an inner surface of the abutting portion 71 contacts with an outer surface of the arm body 33 (including a condition on a verge of contact therewith), and the clip portion 57 enters between the inserting recessed portion 39, an outer circumferential surface of the mounting portion 13 and the surface of the cap 5 without clearance or substantially without clearance (according to the circumstances, a slight clearance is shown in the figures as a matter of convenience for explanation). Therefore, there is no room to allow the leading end portion of the arm body 33 to be deformed, and the arm body 33 is effectively prevented from spreading apart, being deformed, and so on. Here, since the clip portion 57 enters axially inside the engaging pawl 37 and the engaging pawl 37 is supported by the clip portion 57 via the inserting recessed portion 39, the engaging pawl 37 is also effectively prevented from being deformed axially inwardly. Thus, the engaging pawl 37 is not allowed to come off of the outwardly directed engaging projection 53 of the mounting portion 13.

Figure 6:
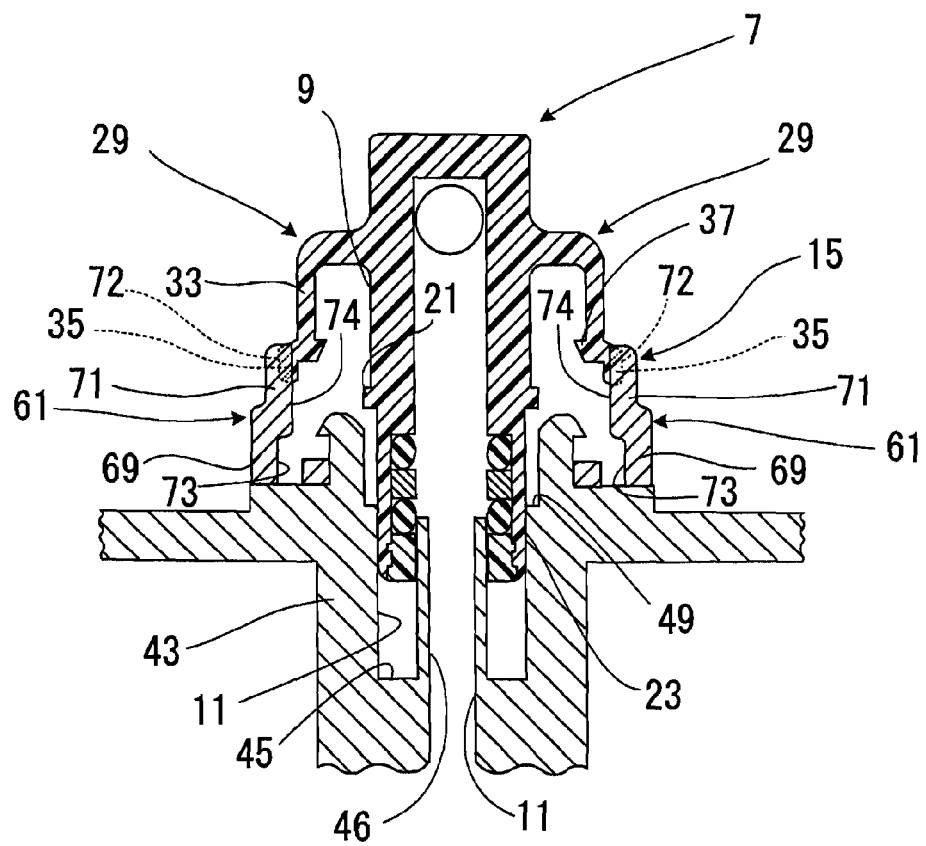
FIG. 6 is a view to explain a status of a checker that is installed when a quick connector is inserted incompletely in a connecting hole.

As shown in FIG. 6, when the inserting portion 23 of the connecting portion 9 of the quick connector 7 is not sufficiently inserted in the connecting hole 11, and the engaging pawl 37 of the arm body 33 does not snap-engage with the outwardly directed engaging projection 53 of the mounting portion 13, the engaging pawl 37, thus the overhanging stop portion 35 is displaced, and located axially outwardly, compared to the case that the quick connector 7 is correctly (completely) connected. However, an axial height of the receiving recessed portion 73 defined inside the receiving portion 69 is designed generally equal to an axial height of the overhanging stop portion 35 or an outer surface side of the overhanging stop portion 35 of the arm body 33. So, the checker 15 is tried to be fitted in vain since the overhanging stop portion 35 is not received in the receiving recessed portion 73 and abuts a leading end of the abutting portion 71 of the verifying portion 61. The checker 15 is not allowed to be further moved in a direction toward the mounting portion 13, and cannot be fitted to the outer circumference of the mounting portion 13. Thereby incomplete connection of the quick connector 7 can be verified.

Figure 7:
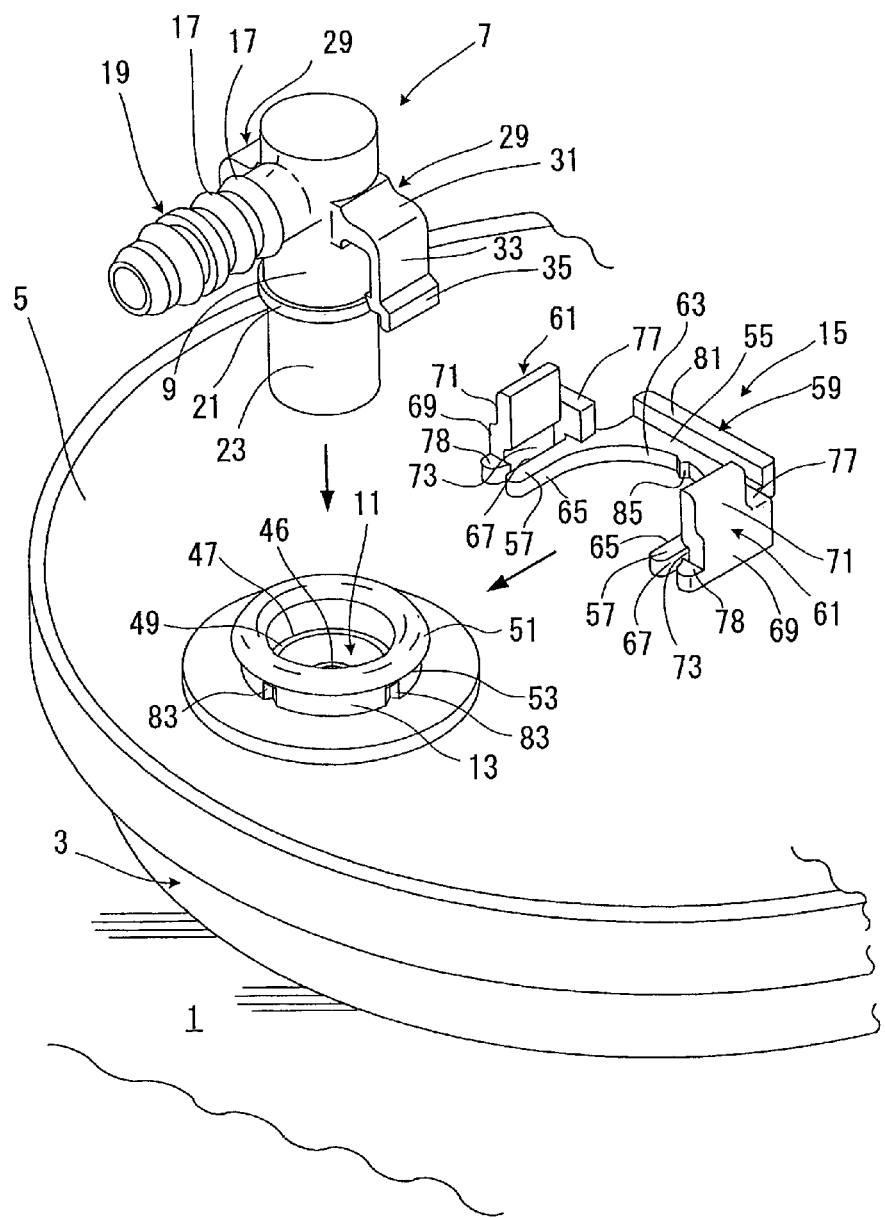
FIG. 7 is a perspective view showing a case that an anti-rotation mechanism is constructed in the connector device.
Figure 8:
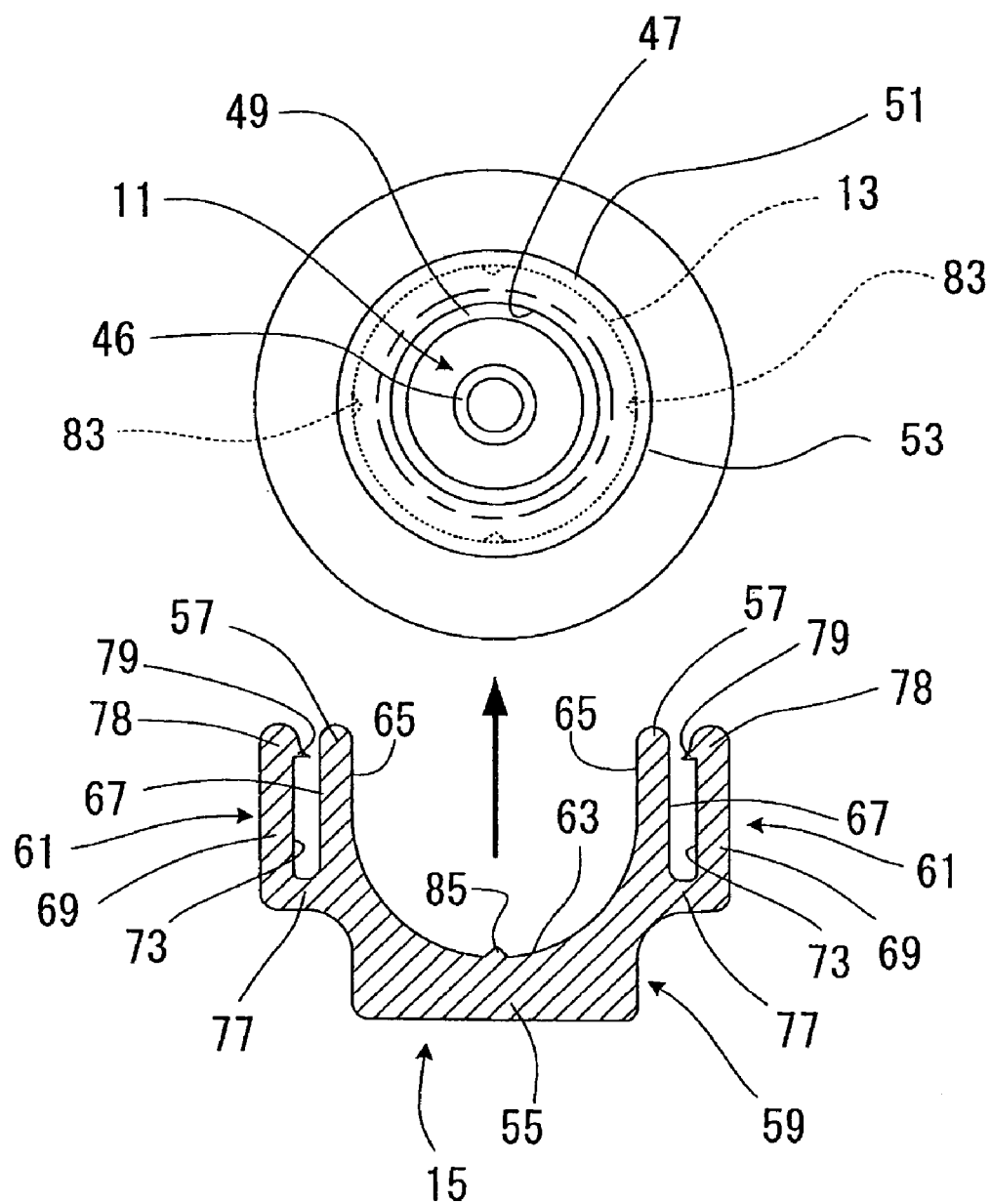
FIG. 8 is a plan view showing the case that the anti-rotation mechanism is constructed in the connector device.

FIGS. 7 and 8 shows a connector device having an anti-rotation mechanism. In FIGS. 7 and 8, elements identical to those of the connector device including a peripheral structure shown in FIGS. 1 to 6 are indicated with identical reference numerals. Therefore, generally, explanations of the identical elements are omitted here. In the connector device having the anti-rotation mechanism, the mounting portion 13 is formed with a plurality of engaging notched portions or engaging dent portions 83 (specifically, four engaging notched portions 83) on an outer circumferential surface thereof, in circumferentially equally spaced relation under the outwardly directed engaging projection 53. Each of the notched portions 83 is has a triangle cross-section. And, an engaging protrusion 85 is formed integrally on a center portion (widthwise center portion) of the fit-on inner surface 63 of the checker 15. The engaging protrusion 85 also has a triangle cross-section so as to seat in the engaging notched portion 83 in circumferentially engaging relation. Here, the quick connector 7 that is inserted in the connecting hole 11 is located at such angular position (mounting angular position in the circumferential direction or mounting rotation angular position) so as to allow the engaging protrusion 85 of the checker 15 to fit in any one of the engaging notched portions 83, and the checker 15 is fitted to the outer circumference of the mounting portion 13. The checker 15 is installed or connected to the mounting portion 13 non-rotatably in the circumferential direction while the engaging protrusion 85 of the checker 15 fits in the engaging notched portion 83 of the mounting portion 13 and engages with the engaging notched portion 83 in the circumferential direction. Or, first, the checker 15 may be disposed on the outer circumference of the mounting portion 13. In this case, the quick connector 7 is rotated with the checker 15 disposed on the outer circumference of the mounting portion 13, then the engaging protrusion 85 of the checker 15 is fitted in any suitable one of the engaging notched portions 83. Here, for example, since the overhanging stop portion 35 of the arm body 33 is caught in and received between the clip portion 57 of the checker 15 and the receiving recessed portion 73, the arm body 33 of the quick connector 7 and the checker 15 are mated or fitted together so as not to rotate relatively in the circumferential direction. Thus, with such anti-rotation mechanism, the quick connector 7 is mounted to the mounting portion 13 (the cap 5) non-rotatably in the circumferential direction. By the way, the engaging notched portion 83 in which the engaging protrusion 85 is fitted is selected, for example, so as to orient the tube fit-on portion 19 in an extending direction of a tube. And, a protruding length of the engaging protrusion 85 or a length or depth of the engaging notched portion 83 is preferably designed about a half (one-half) of a wall-thickness of the main body 59 of the checker 15.

When the connector device or the checker according to the present invention is adapted, for example, for connection in a fluid piping for a motor vehicle, it is possible to easily construct a piping structure where fluid leakage is not caused.

What is claimed is:

1. A connector device comprising:
   a fluid line component that is formed with a connecting hole, and provided with an annular mounting portion raised outwardly on an opening portion of the connecting hole, the mounting portion including an outwardly directed engaging projection of annular shape,
   a connector having a connecting portion to be inserted in the connecting hole for establishing connection to the fluid line component, the connecting portion being provided with at least a pair of stop arms at diametrically symmetrical positions thereof, each of the stop arms including an engaging pawl for snap-engaging with the outwardly directed engaging projection of the mounting portion in locking relation, a checker having a main body to be disposed on an outer circumference of the mounting portion from a lateral side thereof, and verifying portions on widthwise opposite ends of the main body so as to be located outside the stop arms, respectively, and wherein each of the stop arms is provided with a protruding stop portion protruding outwardly, each of the verifying portions being formed so as to locate an inner surface of the verifying portion inside an outer surface of the protruding stop portion, and the inner surface of the verifying portion being formed with a verifying recessed portion for accommodating the protruding stop portion when the engaging pawl correctly engages the outwardly directed engaging projection.

2. The connector device as set forth in claim 1, wherein the protruding stop portion is provided on an axially inner end portion of the stop arm, and the verifying recessed portion is defined in an axially inner end portion of the verifying portion.

3. The connector device as set forth in claim 1, wherein the verifying portion is configured so as to accommodate the protruding stop portion in the verifying recessed portion while contacting with an outer surface of the stop arm.

4. The connector device as set forth in claim 1, wherein the protruding stop portion is configured so as to be caught between the verifying recessed portion and the main body on both sides thereof.

5. The connector device as set forth in claim 1, wherein the main body is configured so as to enter axially inside the engaging pawl that correctly engages with the outwardly directed engaging projection to support the engaging pawl.

6. The connector device as set forth in claim 1, wherein an anti-rotation mechanism is arranged between the mounting portion and the checker for retaining the checker anti-rotationally.

7. The connector device as set forth in claim 6, wherein the anti-rotation mechanism is configured so as to retain the checker selectively at one of a plurality of angular positions.

8. The connector device as set forth in claim 6, wherein the anti-rotation mechanism comprises an engaging notched portion formed in either one of the outer circumference of the mounting portion or the main body of the checker, and an engaging protruding portion provided on the other of the outer circumference of the mounting portion or the main body for fitting and engaging in the engaging notched portion.

9. The connector device as set forth in claim 8, wherein the engaging notched portion is formed on the outer circumference of the mounting portion and the engaging protruding portion is provided on the main body of the checker.

10. The connector device as set forth in claim 1, wherein an anti-rotation mechanism is arranged between the mounting portion and the checker for retaining the checker anti-rotationally, the anti-rotation mechanism comprising a plurality of engaging notched portions formed in the outer circumference of the mounting portion in circumferentially spaced relation and an engaging protruding portion provided on the main body of the checker for fitting and engaging in one of the engaging notched portions, selectively.

11. A combination of a fluid line component and a connector, and a checker for verifying connection therebetween, comprising:

the fluid line component being formed with a connecting hole, and provided with an annular mounting portion raised outwardly on an opening portion of the connecting hole, the mounting portion including an outwardly directed engaging projection of annular shape, the connector having a connecting portion to be inserted in the connecting hole for establishing connection to the fluid line component, the connecting portion being provided with at least a pair of stop arms at diametrically symmetrical positions thereof, each of the stop arms including an engaging pawl for snap-engaging with the outwardly directed engaging projection of the mounting portion in locking relation, each of the stop arms being provided with a protruding stop portion protruding outwardly, the checker having a main body to be disposed on an outer circumference of the mounting portion from a lateral side thereof, a pair of verifying portions provided on widthwise opposite ends of the main body so as to be located outside the stop arms, respectively, and wherein each of the verifying portions is configured so as to locate an inner surface thereof inside an outer surface of the protruding stop portion, and the inner surface of the verifying portion being formed with a verifying recessed portion for accommodating the protruding stop portion when the engaging pawl correctly engages the outwardly directed engaging projection.

* * * * *